UNITED STATES PATENT OFFICE.

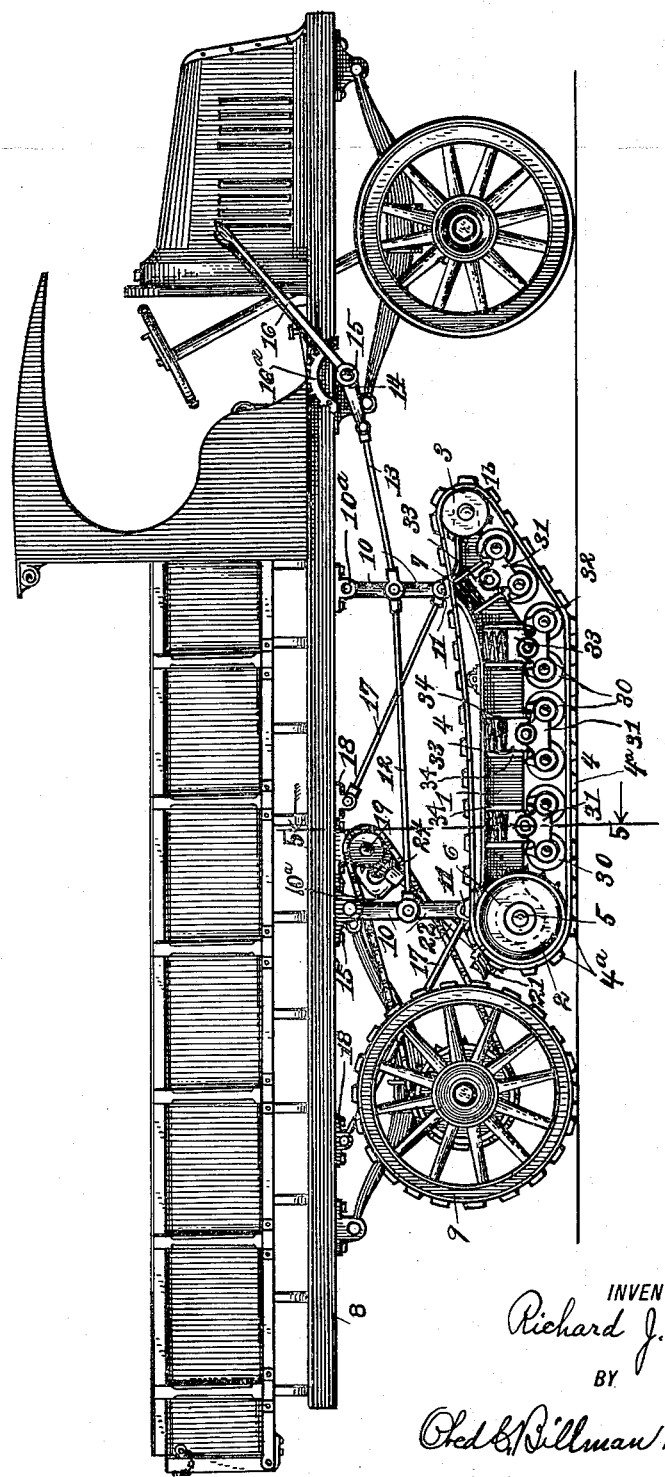

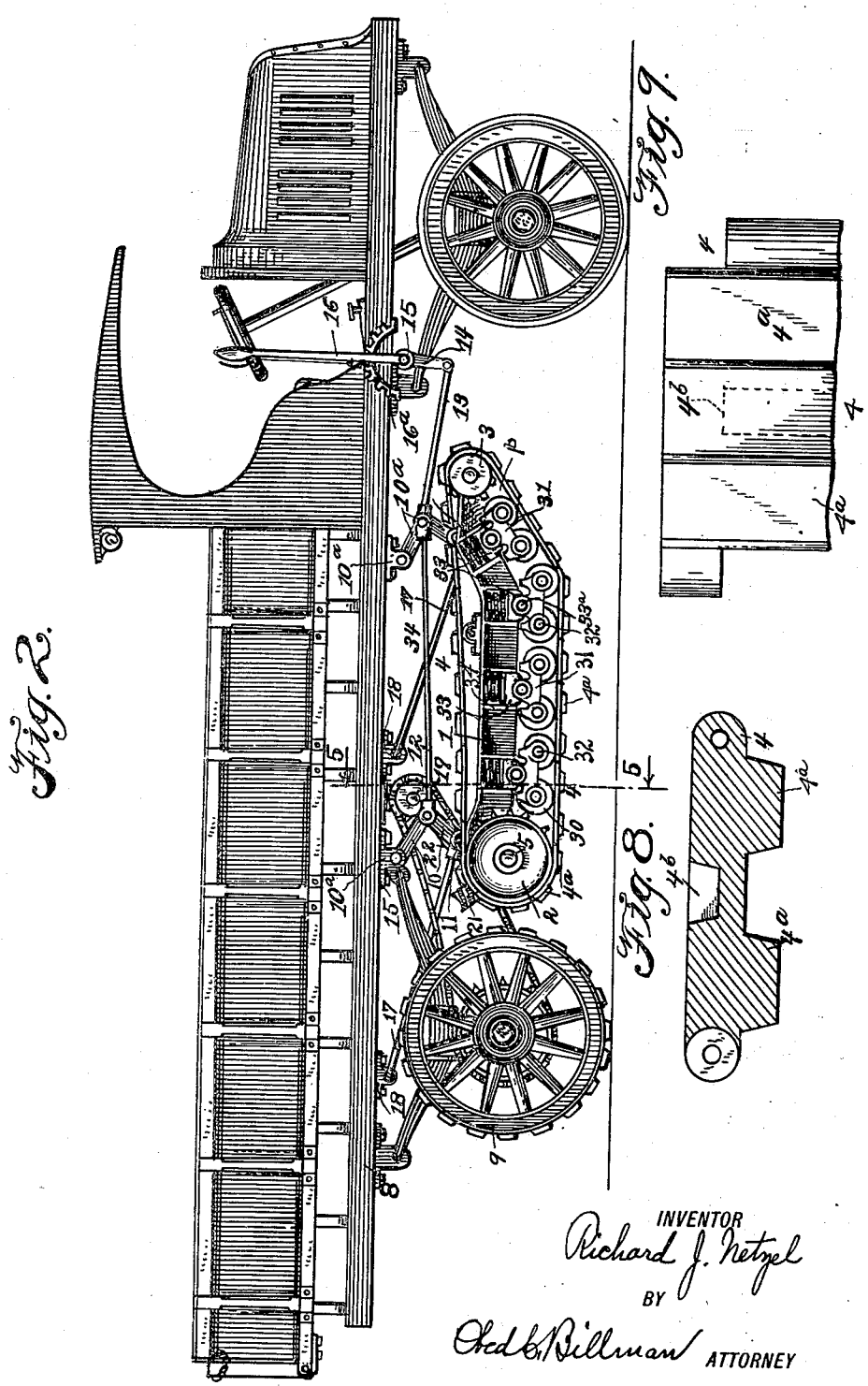

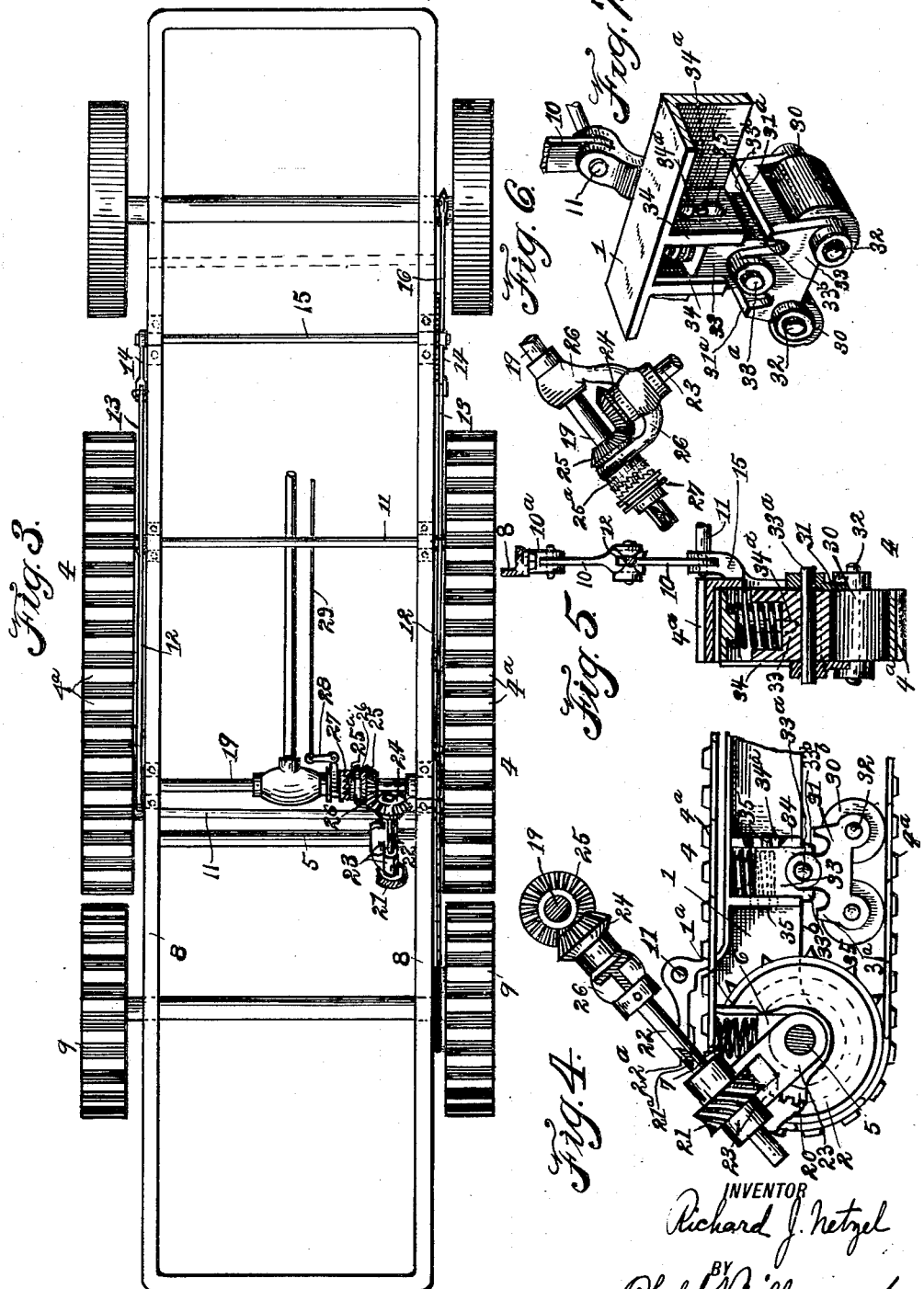

RICHARD J. NETZEL, OF CLEVELAND, OHIO.

TRACTOR DEVICE FOR MOTOR-VEHICLES.

1,296,309.  Specification of Letters Patent.  Patented Mar. 4, 1919.

Application filed October 9, 1917. Serial No. 195,522.

*To all whom it may concern:*

Be it known that I, RICHARD J. NETZEL, a citizen of the United States, residing at Cleveland, in the county of Cuyahoga and State of Ohio, have invented certain new and useful Improvements in Tractor Devices for Motor-Vehicles, of which the following is a specification.

My invention relates to improvements in tractor devices for motor vehicles, and more particularly to that class or type of motor driven or horseless vehicles known as automobiles, motor trucks, and the like.

The invention relates more particularly to that class or type of tractors known as "caterpillar" tractors, and the improved device is particularly adapted for use in connection with motor or horseless vehicles either as a permanent or component part thereof, or as an auxiliary or emergency attachment as may be desired.

The primary object of the invention is to provide a generally improved tractor device of a class mentioned which will be exceedingly simple in construction, cheap of manufacture, and efficient in use.

A further object of the invention is the provision of an improved caterpillar tractor in which the various parts are so constructed, arranged, and combined, as to adapt the endless tractor device or chain to readily conform to and travel upon irregular traction surfaces or stony and obstructed highways, particular provision being made for taking up or absorbing obstructions in the passage of the endless tractor device or chains in their operative tractive position over the surface being traveled upon.

A still further object is the provision of improved means for movably supporting and attaching the improved tractor device to the main vehicle frame together with improved means for connecting the same with and driving the same from the motor of the vehicle.

A still further object is the provision of improved means for bringing the tractor attachment into and out of operative tractive position without in any way interfering with the movement or action of the tractor driving mechanism, or in any way interfering with the ordinary use of the vehicle to which it may be attached.

A still further object of the invention is the provision of an improved emergency tractor device which may be readily attached to or detached from any ordinary vehicle and its driving mechanism, and which is adapted to be readily brought into use as an additional and anti-skidding device.

With the above mentioned and other ends in view, the invention consists in the novel construction, arrangement, and combination of parts, hereinafter described, illustrated in one of its embodiments and applications in the accompanying drawings, and particularly pointed out in the appended claims.

Referring to the drawings, forming a part of this specification, Figure 1, is a side elevation of an ordinary motor or commercial truck equipped with a tractor device constructed in accordance with this invention and shown in its active or operative tractive position.

Fig. 2, a side elevation of the same in its elevated or inoperative position.

Fig. 3, a top plan view of the same as it appears applied to the motor vehicle frame.

Fig. 4, an enlarged detailed view of the tractor actuating or driving gearing and the rear portion of the tractor frame.

Fig. 5, a cross sectional view taken on line 5—5, of Fig. 1, the driving gearing being removed.

Fig. 6, a fragmentary detail view of the gearing connection between the vehicle driving shaft and the driving shaft communicating with the tractor driving mechanism.

Fig. 7, an enlarged detailed perspective view of one of the variable caterpillar tension members and its mounting in the traction frame for maintaining the intermediate portion of the endless tractor member or chain in contact with the traction surface and conforming the same to and adapting the same to take up obstructions.

Fig. 8, an enlarged detailed side elevation of one of the links in the endless tractor member or chain.

Fig. 9, a top plan view of the same.

Similar numerals of reference designate like parts throughout all the figures of the drawings.

In the present embodiment of my invention I have shown the same applied or attached to an ordinary motor truck for use as a supplementary or auxiliary traction device, but it should be understood that the device is capable of a wide range of use and application.

The improved tractor device comprises a suitable tractor frame consisting, in the present instance, of side frame members 1, provided at their ends with wheels 2, and 3, adapted to carry an endless tractor member 4. The wheels 2, and 3, are preferably in the form of sprocket wheels and the endless tractor member 4, is preferably in the form of a sprocket chain, the links of said chain being suitably connected and provided with suitable transverse tractor shoes 4$^a$, on their outer sides and suitable sprocket receiving openings or recesses 4$^b$, on their inner sides (see Figs. 8, and 9) to receive the sprocket teeth of the sprocket wheels 2, and 3.

The endless tractor member or chain 4, is adapted to receive its motion through the medium of the sprocket wheel 2, the latter being mounted on a driving shaft 5, and as a means of permitting the shaft 5, and sprocket wheel 2, to move in the frame 1, while the tractor device is in operation, the driving shaft 5, is mounted in a movable bearing 6, located in a guide way 1$^a$, of the frame 1, and is adapted to be cushioned by means of a spiral spring 7.

As a convenient means of adapting and attaching the device to a motor vehicle of the type shown in the drawings the tractor frame preferably comprises two side frame members 1, located beneath the side members 8, of the vehicle frame so as to carry the endless tractor members 4, in front of the main traction wheels 9, of the motor truck, and as a convenient means of movably supporting and connecting the side frame members 1, to the side members 8, of the motor vehicle, toggle link members 10, are connected to the sides 8, of the vehicle frame through the medium of suitable bearing brackets 10$^a$, and are connected at their lower ends to the top of the side frame members 1, through the medium of suitable bearing members 11, the latter, in the present instance, comprising cross rods or shafts 11, said cross rods being adapted to brace the side frame members 1, and cause the latter to be moved in unison when actuated by the operating mechanism hereinafter described.

As a means of raising and lowering the frame members 1, the inner connected ends of the toggle link members 10, are connected by means of link rods 12, and the latter are connected to connecting rods 13, leading to crank arms 14, on an operating or rock shaft 15, journaled, in the present instance, beneath the sides 8, of the vehicle frame, said rock shaft 15, being operated by means of an operating lever 16, adapted to be secured in its adjusted position in a well known manner through the medium of a rack segment 16$^a$.

As a means of carrying the side frame members 1, of the tractor forwardly in the arc of a circle when elevated as illustrated in Fig. 2, of the drawings, the cross rods or shafts 11, are provided at each end with side or brace rods 17, extending rearwardly and connected at their rear ends beneath the side members 8, of the vehicle frame through the medium of bearing or attaching brackets 18.

As a means of driving the driving shaft 5, from a suitable driving mechanism of the motor vehicle, as for example,—the driving shaft 19, of the motor vehicle, the driving shaft 5, is provided with a worm gear 20, meshing with a worm 21, slidably mounted on a driving shaft 22, so that as the tractor frame members 1, are raised or lowered by the mechanism hereinbefore referred to, the worm 21, and bearing block 23, may slide upon the driving shaft 22, such sliding connection, in the present instance, comprising a spline 21$^a$, adapted to slide in a spline or longitudinal groove 22$^a$, in the shaft 22, thus providing adjustable or variable driving connections for driving the tractor caterpillar mechanism from the motor vehicle in the variable positions of the tractor mechanism, and as a means of driving the driving shaft 22, the latter is provided at its top with a bevel gear 24, meshing with a second bevel gear 25, mounted on the driving shaft 19, of the motor vehicle, said bevel gears 24, and 25, being mounted in a suitable bearing bracket 26, as shown most clearly in Fig. 6, of the drawings.

The second bevel gear 25, is preferably loosely mounted on the driving shaft 19, and is provided with a toothed clutch member 25$^a$, adapted to be engaged by a second clutch member 27, slidably mounted upon and keyed to the driving shaft 19, and being adapted to be shifted by means of a suitably mounted shifting lever 28, provided with a connecting rod 29, adapted to communicate within a suitable operating mechanism at the front of the motor vehicle and within convenient reach of the driver or operator.

As a convenient means for holding the lower member or pass of the endless tractor chain in contact with the subjacent traction surface or roadway, and particularly as a means of enabling such lower member or pass of the endless tractor member to be in engagement with the traction surface or roadway at all times throughout a substantial area and of permitting such endless tractor member to ride over and conform to irregular surfaces and obstructions (and in face take up irregularities and obstructions with respect to the fixed position of the frame members 1) caterpillar tension rollers or members 30, are arranged to bear on the lower pass or active traction member of the endless tractor chain 4, at all times, said tension rollers being preferably arranged in pairs as shown, and being mounted in floating frames 31, through the medium of bearing members or bolts 32, said floating frames or supports 31, being pivotally secured to spring resisted floating bearing blocks 33, through the medium of bearing bolts 33ª, said bearing blocks being mounted in flanged guide members 34, of the side frame members 1, and as a means of removably securing said bearing blocks in such guide members 34, as well as limiting the movements of such bearing blocks 33, of the guide members 34, the latter are provided with guide slots 34ª, (see Fig. 7) adapted to receive and contain guide screws 35, and as a means of providing for a limited movement of the floating frames 31, on the floating bearing blocks 33, the latter are provided with abutments 33ᵇ, against which stop projections 31ª, of the floating frames 31, are adapted to engage, thus stopping the floating frames 31, at their extreme points of vibration in passing over obstructions or irregular surfaces on the roadway. As a means of adapting the endless tractor members 4, to readily pass over obstructions, the forward ends of the frame members 1, are preferably inclined upwardly to provide an upwardly extending incline or pass 1ᵇ, at the front as shown in the drawings.

From the foregoing description, taken in connection with the accompanying drawings, the operation and advantages of my invention will be readily understood.

Having thus described one of the embodiments of my invention, what I claim and desire to secure by Letters Patent, is,—

1. A tractor device for motor vehicles, comprising a vehicle frame, a tractor frame beneath said vehicle frame, wheels carried by said tractor frame, an endless tractor member carried by said wheels, means for movably and bodily supporting said tractor frame in different positions, a relatively movable driving shaft in said tractor frame, and shaft-actuating gearing flexibly connected to said tractor frame for driving said shaft in said different positions of said tractor frame.

2. In an auxiliary caterpillar tractor, a motor vehicle frame, a bodily movable caterpillar frame, wheels rotatably supported at each end of said caterpillar frame, an endless tractor device supported on and carried by said wheels, a vertically movable driving shaft carried by and movable relatively to said caterpillar frame for driving said wheels, shaft actuating worm gearing for driving said driving shaft and endless tractor device in different bodily adjusted positions of said caterpillar frame, and means for movably supporting and attaching said caterpillar frame to said motor vehicle frame in different bodily adjusted horizontal planes with relation thereto.

3. In a tractor device for motor vehicles, a motor vehicle frame, a motor carried thereby, a caterpillar frame carrying a pair of caterpillar tractors, a vertically movable driving shaft in said frame for driving said caterpillar tractor, means for movably and bodily supporting and connecting said caterpillar frame beneath said motor vehicle frame in different horizontal planes, shaft-actuating gearing flexibly connected to said driving shaft and tractor frame for driving said caterpillar tractors in said different horizontal planes, and means for throwing said caterpillar tractors and driving mechanism into and out of gear with said motor of said motor vehicle.

4. A tractor device for motor vehicles, comprising a motor vehicle frame, a tractor frame, wheels and tension rollers carried by said tractor frame, a vertically movable spring-resisted driving shaft carried by said tractor frame and connected to some of said wheels, an endless tractor member carried by said wheels and passing over said tension rollers, means for movably and bodily supporting said tractor frame in different horizontal planes beneath said vehicle frame, and separate means for driving said driving shaft and wheels from the motor driving means of said motor vehicle.

5. In a tractor device for motor vehicles, a motor vehicle frame, a pair of caterpillar tractors, means for movably and bodily supporting and connecting the same to a motor vehicle in different horizontal planes relative to said motor vehicle frame, variable driving shaft and shaft-actuated flexibly-connected gearing for connecting said tractors to said motor of said vehicle, and means for throwing said caterpillar tractors into and out of operative tractive position.

6. An auxiliary caterpillar tractor, comprising a movable caterpillar frame, wheels rotatably supported at each end of said frame, an endless tractor device supported on and carried by said wheels, tension rollers and spring-resisted bearing members in said frame, variable worm gear mechanisms for driving said wheels, and means for movably and bodily supporting, adjusting and attaching said caterpillar frame to a motor vehicle.

7. A tractor device for motor vehicles, comprising a vehicle frame, a tractor frame, means for movably and variably supporting and suspending the latter from and in different bodily adjusted horizontal planes below said vehicle frame, caterpillar tractor mechanism carried by said tractor frame, a vertically-movable spring-cushioned driving shaft carried by said tractor frame, and driving shaft-actuating flexibly-connected gearing for driving said caterpillar mechanism from said motor vehicle in the different adjusted positions of said tractor frame.

8. A tractor device for motor vehicles, comprising in combination with a motor vehicle, a tractor frame, means for movably and variably supporting and suspending the latter in different bodily adjusted positions from said motor vehicle, caterpillar tractor mechanism carried by said tractor frame, and flexibly connected worm gear mechanism for driving said caterpillar mechanism from the driving mechanism of the motor vehicle in the variable positions of said tractor frame.

9. A tractor device for motor vehicles, comprising a movable caterpillar frame including an endless tractor member and floating spring-resisted caterpillar tension members above the lower pass of said endless tractor member for conforming the latter to and adapting the same to travel upon irregular traction surfaces, means for throwing said caterpillar frame into and out of operative tractive position, and worm gear and clutch mechanism for driving said caterpillar traction mechanism from said motor vehicle in various adjusted positions of said caterpillar frame.

10. A tractor device for motor vehicles, comprising a movable caterpillar frame including an endless tractor chain member and floating spring-resisted roller and bearing members above the lower pass of said member for conforming the latter to irregular traction surfaces, means for throwing said caterpillar frame into and out of operative tractive position, a vertically movable spring-cushioned driving shaft carried by said caterpillar frame, and movable worm gear mechanism connected to said driving shaft for driving said caterpillar tractor mechanism from said motor vehicle in the various vertically adjusted tractive positions of said caterpillar frame.

11. In a tractor device for motor vehicles, the combination with the vehicle frame and driving mechanism carried thereby; of a tractor frame provided with caterpillar tractor mechanism, means for movably supporting and suspending said tractor frame beneath said vehicle frame, means for adjusting and holding said tractor frame in various vertically adjusted positions, and variable toothed gear driving connections flexibly connected to said tractor frame and interposed between said motor driving mechanism and said caterpillar tractor mechanism whereby the latter may be driven in the variable adjusted positions of said tractor frame.

12. In a tractor device for motor vehicles, the combination with the side members of the vehicle frame and driving mechanism therefor; of side tractor frames provided with caterpillar tractor mechanism, means for movably supporting and suspending said side tractor frame beneath said side members of said motor frame, means for cushioning said caterpillar tractor mechanism in said tractor frames, means for adjusting and holding said tractor frames in various adjusted positions, and variable worm driving connections flexibly connected to said tractor frames and interposed between said motor driving mechanism and said caterpillar tractor mechanism whereby the latter may be driven in the variable adjusted positions of said tractor frames.

13. In a tractor device for motor vehicles, the combination with the frame thereof provided with driving mechanism and a pair of driving wheels connected therewith; of a tractor frame extending below and movably supported beneath said vehicle frame and provided with caterpillar tractor members in front of said driving wheels, means for moving said caterpillar frame upwardly and downwardly into and out of operative tractive position in front of said tractor wheels, and flexible toothed gearing flexibly connected to said driving mechanism and tractor frame for driving said tractor members in various adjusted positions.

14. In a tractor device for motor vehicles, the combination with the frame thereof provided with driving mechanism and a pair of driving wheels connected therewith; of tractor frames movably supported beneath said vehicle frame and provided with caterpillar tractor members in front of said driving wheels, means for connecting and reinforcing said tractor frames, means for moving said caterpillar frames upwardly and downwardly into and out of operative tractive positions in front of said tractor wheels, vertically movable spring-resisted bearing members in said tractor frames for cushioning said driving wheels and caterpillar tractor members and means for driving said tractor members in various adjusted positions.

15. In a tractor device for motor vehicles, the combination with the side frame members thereof, and a cross driving shaft carried thereby; of a pair of caterpillar tractors provided with toggle links connected to said side frame members, link members connected to the intermediate portions of said toggle links, an operating lever connected to and adapted to operate said link members whereby said toggle links are adapted to raise and lower said caterpillar tractors, gear mechanism for operating said caterpillar tractors from said driving shaft, and means for connecting and disconnecting said operating mechanism to said driving shaft independently of said caterpillar tractor togglelink operating mechanism.

16. In a tractor device for motor vehicles, the combination with the side frame members thereof, and a cross driving shaft carried thereby; of caterpillar tractors provided with toggle links connected to said side frame members, link members connected to said toggle links, an operating lever connecting to the intermediate portions of said link members whereby said toggle links are adapted to raise and lower said caterpillar tractors, worm gear and clutch mechanism for operating said caterpillar tractors from said driving shaft, and means for connecting and disconnecting said operating mechanism to said driving shaft.

17. In a tractor device for motor vehicles, the combination with a vehicle frame, a driving shaft carried thereby, and traction wheels operatively connected to said driving shaft; of a tractor frame comprising side frame members arranged in front of said traction wheels, toggle links carrying said side frame members and connected to said vehicle frame, means for actuating said toggle-link members whereby said side frame members of said tractor are moved downwardly into and upwardly out of their operative tractive positions, tractor wheels and endless tractor members carried by said side frame members, and means for driving said tractor wheels from the driving shaft of said motor vehicle.

18. In a tractor device for motor vehicles, the combination with a vehicle frame, a driving shaft carried thereby, and traction wheels operatively connected to said driving shaft; of a tractor frame comprising side frame members arranged in front of said traction wheels, toggle links connected to said vehicle frame and carrying said side frame members, means for actuating said toggle-link members whereby said side frame members of said tractor are moved downwardly into and upwardly out of their operative tractive position, means for holding said frame members in various adjusted positions, tractor wheels and endless tractor members carried by said side frame members, and worm gear and clutch mechanism for driving said tractor wheels from the driving shaft of said motor vehicle.

19. A tractor device for motor vehicles, comprising a tractor frame, spring-resisted wheels and tension rollers vertically movable in said frame, an endless tractor member carried by said wheels and tension rollers, a driving shaft connected to some of said wheels, and floating frames carrying said tension rollers and having a limited oscillatory movement in said frame.

20. In a tractor device for motor vehicles, a tractor frame provided at one end with a vertically movable driving shaft having a sprocket wheel thereon, a sprocket wheel at the opposite end of said frame, an endless tractor member carried by said sprocket wheels, and caterpillar tension rollers and bearing members vertically movable in said frame above the lower pass of said endless tractor member for conforming the latter to irregular traction surfaces.

21. In a caterpillar tractor, a caterpillar tractor frame, a sprocket driving wheel at one end of said frame and a driven sprocket wheel at the opposite end thereof, an endless tractor member supported on and carried by said wheels, a driving shaft connected to said sprocket driving wheel, worm and worm gear mechanism connected to said driving shaft, spring-resisted bearing members mounted in said frame, floating frames mounted in said bearing members and having a limited rocking movement therein, and tension rollers mounted in said floating frames and bearing above the lower pass of said endless tractor member.

22. In a tractor device for motor vehicles, a pair of caterpillar tractor frames, a vertically movable driving shaft mounted in and connected to the ends of said frames and provided with sprocket wheels at the opposite ends of said frames, endless tractor members carried by said sprocket wheels, spring-resisted floating bearing blocks mounted in said frames, floating frames pivotally connected to said bearing blocks and each provided with a pair of tension rollers above the lower pass of said endless tractor members and conforming the same to and adapting the same to travel upon irregular traction surfaces, and worm and worm gear mechanism operatively connected to said driving shaft.

In testimony whereof I have affixed my signature in the presence of two witnesses.

RICHARD J. NETZEL.

Witnesses:
 W. GRAVES,
 O. C. BILLMAN.